(12) United States Patent
Daggubati et al.

(10) Patent No.: US 6,578,050 B1
(45) Date of Patent: Jun. 10, 2003

(54) METHOD AND APPARATUS FOR IMPLEMENTING PERSISTENCE IN NAME SERVICES ASSOCIATED WITH COMPUTER SYSTEM

(75) Inventors: Ratna K. Daggubati, Southlake, TX (US); Wing K. Lee, Irving, TX (US); Dora Potluri, Irving, TX (US); Jianxiang Yang, Plano, TX (US); Yiquin Ye, Plano, TX (US)

(73) Assignee: Sprint Communications Company, L.P., Overland Park, KS (US)

( * ) Notice: Subject to any disclaimer, the term of this patent is extended or adjusted under 35 U.S.C. 154(b) by 285 days.

(21) Appl. No.: 09/585,643

(22) Filed: Jun. 1, 2000

(51) Int. Cl.[7] .............................................. G06F 17/30
(52) U.S. Cl. .................................................. 707/104.1
(58) Field of Search ................................ 707/103 R, 3, 707/10, 104.1; 709/203, 230, 316

(56) References Cited

U.S. PATENT DOCUMENTS

| | | | | |
|---|---|---|---|---|
| 5,873,092 A | * | 2/1999 | Cheng et al. | 707/103 R |
| 6,044,379 A | * | 3/2000 | Callsen | 707/10 |
| 6,085,030 A | * | 7/2000 | Whitehead et al. | 709/201 |

OTHER PUBLICATIONS

"Directory–Enabled Computing: The Directory's Expanding Role," Dec. 28, 1999, The Burton Group's Network Strategy Overview.

"Comparing Directories and Relational Database: Not a Zero–Sum Game," Jan. 25, 2000, The Burton Group's Network Strategy Overview.

* cited by examiner

Primary Examiner—Diane D. Mizrahi
Assistant Examiner—Apu M Mofiz
(74) Attorney, Agent, or Firm—Harley R. Ball; Steven J. Funk; Kevin D. Robb

(57) ABSTRACT

A naming service implementation method and apparatus. The method involves creating a name service, preferably compliant with the CORBA CosNaming Specification, where the name service is arranged to store persistent information using a directory service. This aspect involves creating a storage mechanism comprising a directory service, preferably a directory service compliant with LDAP version 2, which is arranged to store the persistent information for the name service. An additional embodiment may be implemented by creating a data store interface for interacting with the directory service, wherein such interaction comprises the use of protocol compliant with LDAP version 2.

14 Claims, 3 Drawing Sheets

METHOD AND APPARATUS FOR IMPLEMENTING PERSISTENCE IN NAME SERVICES ASSOCIATED WITH COMPUTER SYSTEM

BACKGROUND OF THE INVENTION

1. Field of Invention

The invention relates generally to methods and apparatuses for implementing name services in distributed object systems. More particularly, the invention relates to methods and apparatuses for implementing CORBA compliant name services.

2. Description of Relevant Art

Name services are often implemented within distributed object systems to enable distributed objects to be readily identified. One type of a distributed object system which uses name services includes a distributed object system that is defined under the Common Object Request Broker Architecture (CORBA) specification produced by OMG. Distributed object systems which use name services may be in the context of an. Object Request Broker (ORB) implemented under the CORBA specification from the OMG, Revision 2.0, Revision 2.1, Revision 2.2 and Revision 2.3, all of which are incorporated herein by reference in their entirety. Specifically, the "CosNaming" module of the CORBA Services specification, as specified in the CORBA specification from the OMG, may be used to implement name services. For purposes of this application, programs compliant with CORBA Revision 2.3, 2.2, and 2.1, by definition will be viewed as compliant with CORBA Revision 2.0. Unless otherwise specified, a generic reference to the CORBA Services specification will be presumed to be OMG's CORBA Services Revision 2.0. The components of the CORBA Services specification detailed above which address name services will be referred to hereinafter as the CORBA CosNaming Specification.

A name service, which may be associated with a name server, is typically arranged such that, when provided with a name, the name service associates the name with "something," e.g., an object, an object reference, or a property. The association of the name with an object, for example, may either be transient or persistent. For a transient name service, the association between a name and an object generally disappears once the program which implements the name service terminates. Alternatively, for a persistent name service, the association between a name and an object is stored in a data file, and does not disappear once the program which implements the name service terminates. In general, the implementation of a name service often includes the implementation of a data structure such as a table (or hash table) to hold bindings between names and object references and, in some cases, properties. Such a data structure, in other words, may be used to associate names with object references, as well as properties. Such a data structure is maintained in a data store and accessed through a data store interface, where such data store may be persistent or transient.

Both U.S. Pat. No. 6,044,379 to Callsen, issued Mar. 28, 2000 for "Method and apparatus for efficiently implementing multiple storage mechanism for name services associated with a computer system" and U.S. Pat. No. 5,873,092 to Cheng, et al., issued Feb. 16, 1999 for "Information handling system, method, and article of manufacture including persistent, distributed object name services including shared properties" address efforts to improve naming services and provide detailed background information known to those of skill in the art regarding the operations of naming services. Both of these patents are incorporated herein by reference.

A typical implementation of a name service includes a "main" table. Although the main table may take on a variety of different configurations, the main table is typically a look-up table, or a list, which associates names in a name column of the main table with references in a reference column of the main table. References in the reference column identify, or reference, objects which are associated with names. By way of example, name "X" is associated with reference "x.sub.p", which is a reference to a specific object. As such, reference "x.sub.p" is essentially an object reference which identifies the specific object. A reference is also referred to as an object reference or simply a reference, which in a CORBA compliant system is typically a relatively extensive IOR. The use of a name service enables a name, such as name "X", to be remembered, instead of reference "x.sub.p", when access to the specific object is desired. By using a name as an index into the main table to identify an object, the overhead, and, hence, the complexity associated with locating objects can be reduced.

A look-up table, which is included as a part of a name service, may either be transient or persistent. For a transient name service, local look-up tables, i.e., look-up tables which were created locally during a process, are temporarily stored in volatile memory, and are not stored into a file. As such, when a program which implements the local look-up tables terminates, the local look-up tables, in addition to information contained in local look-up tables, is destroyed. Alternatively, for a persistent name service, the local look-up tables are stored into files, as for example files on a non-volatile memory, such as a disk. Hence, data contained in look-up tables associated with a persistent name service is not destroyed when the program which implements the look-up tables is terminated.

A name may generally be expressed as an array of name components. In a CORBA compliant system, each of the name components comprises a pair of strings (the id string and the kind string). In other words, although a name may be expressed as "/a/b/c/d" (or even "abcd"), when a name is to be processed, e.g., bound or resolved, the name is typically processed as an array of components [a, b, c, d], and for illustrative purposes will be referred to in this fashion. When the name [a, b, c, d] is being "looked up," or resolved, using a name service, the components of the name are looked up sequentially. The first component of the name, i.e., "a," is resolved first, while the last component of the name, i.e., "d," is resolved last. For example, a name service implementation may include multiple look-up tables which may be used to identify a reference to an object that is associated with and, hence, may be identified by name [a, b, c, d]. Such a name service implementation could include a main look-up table which is used to associate a reference "a.sub.p" with a first component "a" of name [a, b, c, d].

Reference "a.sub.p" identifies a second look-up table in which a second component "b" of name [a, b, c, d] may be found. Second component "b" is associated with a reference "b.sub.p" which identifies a third look-up table. The third -look-up table is used to find a third component "c" of name [a, b, c, d], which is associated with a reference "c.sub.p" that references a final look-up table. In this example, the final look-up table is the last in a chain of look-up tables associated with name service implementation. However, as will be appreciated by those skilled in the art, the number of look-up tables associated with a name is often dependent upon the number of components in the name.

The final look-up table associates, e.g., binds, component "d" of name [a, b, c, d] with a reference "O.sub.ptr". In other words, when name [a, b, c, d] is traversed until only component "d" remains, component "d" may then be bound to reference "O.sub.ptr" which references an object which is associated with the overall name "abcd." When the name service stores look-up tables, either in volatile memory or in non-volatile memory, the four tables are all stored. As will be appreciated by those skilled in the art, typically, either all or none of tables are stored. When all tables are stored, by way of example, the first table is either temporarily stored in volatile memory, such that the first table is destroyed when the program that implements the name service implementation terminates, or the first table is written into a file on a disk. In other words, for a transient name service, the first table is stored in volatile memory, whereas for a persistent name service, the first table may be stored on a disk. By analogy, the other tables are stored in the same manner.

Some name services may also store properties in look-up tables. For example, the final look-up table may include references to a property table which contains a property that is associated with name [a, b, c, d]. A reference "prop" associated with name [a, b, c, d] may identify a property table which contains properties and may, in some instances, also include objects.

The data from the various look-up tables is stored in a data store or a group of data stores, which may be transient or persistent, as discussed above. Information or data is placed into and retrieved out of the data stores by a data store interface. To the extent the prior art addresses the use of persistent data stores to support name services, the prior art has focused on the use of relational databases as the primary vehicle for data storage.

In other areas of programming, alternative methods do exist to the use of relational databases as data stores. One alternative is the use of flat files. Another alternative is the use of directory services. One standardized method of implementing directory services, and data store interfaces to interact with directory services, is the use of the Lightweight Directory Access Protocol version 2, the specification of which is incorporated herein by reference in its entirety. Hereinafter, when discussing this specification, it may also be referred to as LDAP version 2. LDAP version 3 also may be used and its specification is also herein incorporated by reference. LDAP is used as a generic designation for interfaces and protocols compliant with a version of the Lightweight in Directory Access Protocol. For purposes of this application, by definition any server or interface which is compliant with LDAP version 3 would also be viewed as compliant with LDAP version 2. The converse is not necessarily correct.

SUMMARY OF THE INVENTION

The invention comprises methods and apparatus for implementing a name service. According to the present invention, a name service with:at least one storage mechanism may be implemented by creating a name service, preferably compliant with the CORBA CosNaming Specification, where the name service is arranged to store information in persistent storage. For the purposes of this application "persistent information" will be defined as information which either is stored in persistent storage or is to be stored in persistent storage. The storage mechanism comprises a directory service, preferably a directory service compliant with LDAP version 2, and is arranged to store the persistent information for the name service. The name service may be further implemented by creating a data store interface for interacting with the directory service, wherein such interaction comprises the use of protocol compliant with LDAP version 2.

From a different perspective, this aspect of the invention involves a name service within a computer system, the name service being arranged to store persistent information. The name service has at least one storage mechanism arranged to store the persistent information, wherein the storage mechanism comprises a directory service. The name service also has a data store interface for interacting with the directory service, wherein such interaction comprises the use of protocol compliant with LDAP version 2. In an alternative embodiment such interaction consists essentially of the use of protocol compliant with LDAP version 2. And in a third embodiment, such interaction consists of the use of protocol compliant with LDAP version 2.

Another variation calls for a computer system arranged to implement at least one storage mechanism for a name service, where the name service being arranged to store persistent information. The computer system comprises a processor, a data store interface for interacting with the storage mechanism, and at least one storage mechanism arranged to store the persistent information. The storage mechanism is in the form of a directory service encapsulated in the data store interface.

Finally, this aspect may be expressed as a computer program product for implementing a name service having at least one storage mechanism. The computer program product includes computer code that creates a name service arranged to store persistent information, computer code that creates a data store interface for interacting with the storage mechanism, and computer code that creates the storage mechanism which is arranged to store the persistent information. In this embodiment, the storage mechanism comprises a directory service and is encapsulated in the data store interface. The computer program product incorporating the above computer codes also includes a computer readable medium that stores the computer codes. In a preferred version of this computer program product, the interaction between the data store interface and the storage mechanism comprises the use of protocol compliant with LDAP version 2 and the directory service is compliant with LDAP version 2. An alternative embodiment of the computer program product specifies that the computer readable medium is a code representation embodied in a carrier wave.

DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The most preferred embodiment of the name service implementation of the present invention, hereinafter referred to as PNS, offers several key features that are not available in 3rd party solutions. A set of features in the most preferred embodiment is detailed as follows. PNS may be integrated with an LDAP server for persistence. PNS supports a federated naming hierarchy. PNS provides a Java Based GUI tool for browsing and maintaining the naming hierarchy. PNS also provides Java based tools which may be used to replicate the Naming hierarchies. PNS supports the use of a light-weight HTTP server for client boot-strapping via standard HTTP 1.0 protocol. PNS provides name space overloading for automated load balancing using a round robin approach. PNS also incorporates rudimentary fault checking in conjunction to its load balancing function. While its most preferred embodiment encompasses all of these features, improvement over prior art name service implementations may be obtained through the employment of any one or any combination of these features. The detailed description will address embodiments incorporating each of these features, but one of skill in the art will recognize that the particular combinations chosen for these example embodiments may be modified while still maintaining improvements over the prior art.

Figure 1:
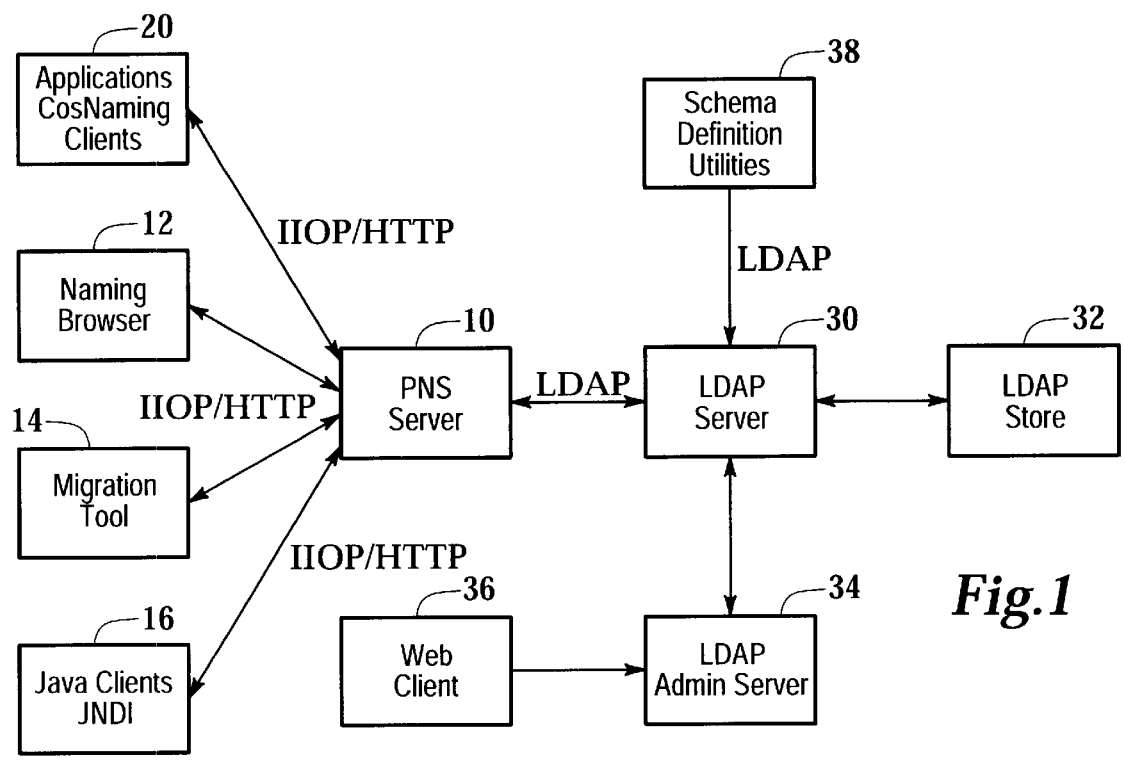
FIG. 1 is a diagrammatic representation of the system architecture of the most preferred embodiment.

FIG. 1 depicts the overall architecture of the most preferred embodiment of PNS. PNS Server 10 implements CosNaming specification along with HTTP Bootstrapping. Applications (CosNaming Clients) 20 using CORBA 2.2 compliant ORB's can connect to PNS Server 10 using HTTP/IIOP. PNS products working with the PNS server also include Naming Browser 12, Migration tools 14, and JNDI 16 which use standard visibroker java based ORB to communicate to the PNS Server 10. In persistent mode, PNS Server 10 communicates to LDAP Server 30 via LDAP v2 protocol. The LDAP server 30 can be configured to use relational database or disk based persistence as LDAP store 32. LDAP admin server 34 is also installed, to manage more than one instance of LDAP servers 30 from a central console. LDAP admin server 34 provides a central console accessible by web clients 36. Schema definition utilities 38 are also provided in Java that will customize LDAP Schema for PNS usage, and will interactively prompt for user accounts to be created.

The following details apply to the most preferred embodiment of PNS. PNS runs on Solaris 2.6 or HP-UX 11.0. PNS may be accessed from any Operating System as long as the ORB (Object Request Broker) is CORBA 2.2 compliant. PNS may run in both a persistent and a transient mode. In its persistent mode PNS will use an LDAP server to store the object bindings. In persistent mode, when PNS is restarted, the naming tree is rebuild with out any loss of information. PNS preferably will use Zoomit on NT as its LDAP server or Netscape Directory Server 4.1 on Sun Solaris 2.6 & HP-UX 11.0. In its transient mode, when PNS is restarted it will lose all the information it has before shutdown. This mode is ideal for development & unit testing, as it is very easy to install.

Persistence using directory service

One embodiment of PNS specifically involves the use of directory services, particularly LDAP compliant directory services, to provide persistent storage, particularly for name services which comply with the CORBA CosNaming Specification. The following section discusses the details of this embodiment.

In developing persistent name services, the art has inclined towards the use of relational databases such as Oracle, DB2, etc. But there has been recent recognition that the use of relational databases involves trade offs over some of the alternative data stores. One area of discussion has been the relative advantages and disadvantages of the use of directory services as data stores. The recent publication "Directory-Enabled Computing: The Directory's Expanding Role" in The Burton Group's Network Strategy Overview dated Dec. 28, 1999 provides detailed descriptions of the use and functioning of directory services and is incorporated herein by reference. The even more recent publication "Comparing Directories and Relational Databases: Not a Zero-Sum Game" in the Burton Group's Network Strategy Overview dated Jan. 25, 2000, provides a detailed discussion of perceived differences between directory services and relational databases and is incorporated herein by reference.

Directory services and relational databases use diametrically opposed models and are suited for different roles. Directories are best for enabling fast searches for corporate resources, managing users and security, and providing a central integration point for a variety of applications and services. Relational databases are best for more transactional applications in which data changes often and transactional integrity is critical. Nor are the two completely independent. Some directory products actually use relational databases as their directory information base storage system, but even those directory products use a hierarchical, object oriented information model. For the purposes of this application, a directory service is defined as a data store which uses a hierarchical, object oriented information model, rather than the relational data model incorporated by relational databases. Particularly, a data store which interacts with its data store interface through the use of protocol compliant with any version of LDAP, and preferably LDAP version 2, would clearly be within the definition of a directory service.

By using a directory service to provide a persistent data store for the name service a number of advantages are obtained over the use of relational databases. The persistent data store will be highly scalable for large installations. There will be very low overhead for adding new references. The search capabilities will be very efficient. Directory services, particularly LDAP compliant directory services, have a very strong naming model, information model, and security models as opposed to relational databases. Additionally, the LDAP naming model fits particularly well with the CosNaming Model of the CORBA CosNaming Specification. Hence additional synergies may be developed through reduced complexity when a name service compliant with the CORBA CosNaming Specification uses an LDAP compliant directory service to provide persistence. Finally, the directory service provides built-in support for federation, which can be used to support federation of naming services.

As a result, one embodiment of this invention uses a directory service as the data store to provide persistence to the name service. The name service would use at least one storage mechanism to store the persistent information, where the at least one storage mechanism would comprise a directory service. The directory service is preferably compliant with LDAP version 2. The name service is preferably compliant with the CORBA CosNaming Specification. Between the data store and the rest of the name service there would be a data store interface which would preferably encapsulate the data store. The data store interface between the data store and the rest of the name service would preferably communicate with the data store with protocols comprising protocols compliant with LDAP version 2. More preferably, the communications between the data store and the data store interface would consist of protocols compliant with LDAP version 2, but this might not be best for all potential applications.

Federated naming service

In federated naming, one instance of a name service may contain a symbolic link to the names and object references held in a second name service, possibly on a separate server. In so doing, any requests for such names to the first server could be handled and delegated to the second server. By using federated naming, it would only be necessary to bootstrap to one naming service, simplifying the programming model and eliminating or reducing the need to synchronize the affected data stores. Because of the reduction in complexity to federated naming brought about by use of an LDAP compliant directory service for persistence, federated naming is more easily and efficiently accomplished under the present invention. Specifically, the use of an LDAP compliant directory service, with its built-in referral service, creates a simpler implementation of CORBA compliant federated naming by mapping the CosNaming Federation to the LDAP referral service. Additionally, federated naming helps decrease some of the transactional concerns of use of directory service rather than relational database by improving synchronization. Hence one embodiment of the PNS may provide a federated naming service in combination with persistence provided by LDAP directory service.

Replication Tool

One embodiment of the PNS additionally provides Java tools for easier access to and maintenance of the name service. In one embodiment, a tool may be provided through which the user picks a particular level of the directory tree. The tool will then replicate the directory from that level downwards or from that level upwards at the selection of the user. This replicated directory may be saved for use by a second name service on the same or on an alternate server. This provides the ability to troubleshoot problems using the second name service, without interfering with the ongoing production operation of the primary name service. Additionally, the ability is provided to take a snapshot of a transient data store of a name service which may be used to maintain the store while the name service which is being shut down to be maintained, modified, or upgraded. After the maintenance is complete, the copied information may be returned to the upgraded name service, without need for all programs and systems across the enterprise to re-register. The tools do not have to be java based, but are preferably java-based tools for cross-platform compatibility. The tool may also simply replicate the entire naming hierarchy for use by a second name service to duplicate the production environment for troubleshooting. But the greater flexibility of choosing which level to start the replication at is preferable.

An additional embodiment involves the use of a java-based tool providing a GUI interface to use to page through the naming hierarchy to correct errors or eliminate stale references "by hand." This provides greater ease of use than the traditional command line interfaces used with most current implementations of name services. The same tool may also be used for browsing the name hierarchy for informational or evaluation purposes. Effectively this tool is a Naming Browser that will let you view & manipulate the name space. The preferred version of this embodiment provides a Java browser which runs on any system with at least Java Runtime Engine 1.1.7 (JRE 1.1.7) installed and available.

Bootstrapping

One embodiment of PNS provides support of a lightweight HTTP server for client boot-strapping via standard HTTP 1.0 protocol. This HTTP agent enables applications from different ORB vendors to easily bootstrap to the naming service. Without such an agent, applications will either have to hard code the IOR (interoperable object reference) or read from an IOR file distributed by the naming service. Both of these approaches have drawbacks, as they place additional burden on the operations support staff who have to distribute a new IOR file every time PNS has been restarted. Because this embodiment of PNS recognizes a lightweight HTTP protocol through an embedded lightweight HTTP agent, non-visibroker clients are enabled to connect to the naming service. This solves the interoperability problem of the resolve_initial_reference( ) command, which unfortunately does not recognize other vendors' CORBA services. This problem may be less significant in name services compliant with the requirements of CORBA Services revision 2.3, but the HTTP bootstrapping still may provide a simpler and more elegant method of entry.

Load Balancing

An alternative preferred embodiment of PNS incorporates a way to distribute the load on the server objects without extending or violating the CORBA CosNaming Specification. This feature has value independent of whether PNS is running in a persistent mode, or purely on a transient basis. This distribution of the load is often referred to as load balancing or load sharing. In load balancing, where several different objects will serve similar or identical functions, a name service will return one of a set of names instead of one specific reference. This is intended to distribute the load among the several objects of the set (or class). Most commonly, without a load balancing arrangement, each application (or client) which might call one of the class of objects would be programmed with a static setting to call a specific object. If several applications are running which are set to call one specific object, while none of the applications set to call one of the other objects of the class are running, the one specific object (and the server it is running on) will have a greater load, while the uncalled objects (and the servers on which they are resident) will have no load at all. An alternative basis has applications programmed with a complex setting which provides a series of choices which must be processed by the application (i.e. if x then call y, if not x, then call z, if not z . . . ). It is often preferable to distribute this effort away from the applications and to the name service, particularly where the name service has better notice of what objects are registered at any given time. Otherwise reprogramming of the applications (typically by modifying their .ini file) must be accomplished on a regular basis to best tune the system. Hence it is typically preferable to try to accomplish load balancing in the name service rather than at the level of the applications.

Load balancing attempts to create a system which will distribute the load among different objects performing identical or similar functions. Several varieties of load balancing are recognized by those of skill in the art. A common link is that the applications (also referred to as clients) are programmed to call a more generic object name which describes the class of objects performing similar functions without specifying a particular object. The preferred embodiment of the present invention provides a method of load balancing while still providing CORBA compliant name service. This is accomplished through the use of name overloading.

Name overloading is the provision of additional distinguishable information within the confines of the lowest level name component identifying the object. This is accomplished by using a specific character (the load balancing character) chosen by the program which is recognizable but uncommonly used in naming parlance. In the preferred embodiment under discussion, the specific character chosen is "'" or ASCII character no. 96. One of skill in the art will recognize that other characters could equally be chosen without losing any of the benefits of the present invention. The lowest level name component uses a load balancing identifier as the first part of its name component, followed by the load balancing character, followed by an identifying name specific to the object being designated (for example a sequence number could be used as the identifying name). Other objects of the same class accomplishing identical or similar functions would use the same load balancing identifier, the load balancing character, and their own specific identifying name for their lowest level name component.

For example: In the most preferred version of this embodiment the following criteria must be satisfied for the lowest level name component to be used as an object binding which provides load balancing. The object bindings must have ' in the name. The syntax is ANYNAME'SEQUENCENUMBER. All the object bindings should have the same name that precedes the load balancing character. The clients looking up for the reference must request for name that precedes the load balancing character.

In a specific example:
PNS will determine between the following three object references.
SNMP-Implementor'1
SNMP-Implementor'2
SNMP-Implementor'daunip01

When clients resolve("SNMP-Implementor"), PNS will determine (or choose) between the three of them. Client can force PNS NOT to use load balancing by asking for a particular Object-Reference using its full name (the full name component of its lowest level name component). For example: Resolve("SNMP-Implementor'daunip01") will force PNS to return the exact Object reference.

The most preferred load balancing algorithm in the environment of the present invention supports a round robin approach. This is more efficient given the information available under the CORBA CosNaming Specification. Alternative methods of determining which object reference to return could also be employed, as would be recognized by one of skill in the art. Clients may override this behavior by requesting a specific instance of the server object.

To implement the load balancing through the use of name overloading, the name service, and more particularly the data store interface must incorporate enhanced bind and resolve operations. One of skill in the art will also recognize that other operations, including but not limited to rebind and destroy, will likewise need to be enhanced to take advantage of these features. A detailed description of the preferred embodiments of the bind and resolve operations used to implement the load balancing feature follows.

A name service includes a naming context. A naming context is an interface, e.g., the NamingContext interface from the CosNaming module that is a part of the CORBA Services specification which is incorporated by reference herein. A naming context generally allows a hierarchical name space structure to be created, and is used to implement a naming context implementation base. In other words, a naming context is arranged to contain a name service. Specifically, a naming context object associated with naming context generally stores a table of bindings which enable the hierarchical name space structure to be created. Such a hierarchical name space structure allows object references to be traversed. Hence, a naming context generally allows names with multiple components to be resolved down to the last component of the name, as will be appreciated by those skilled in the art.

Figure 2:
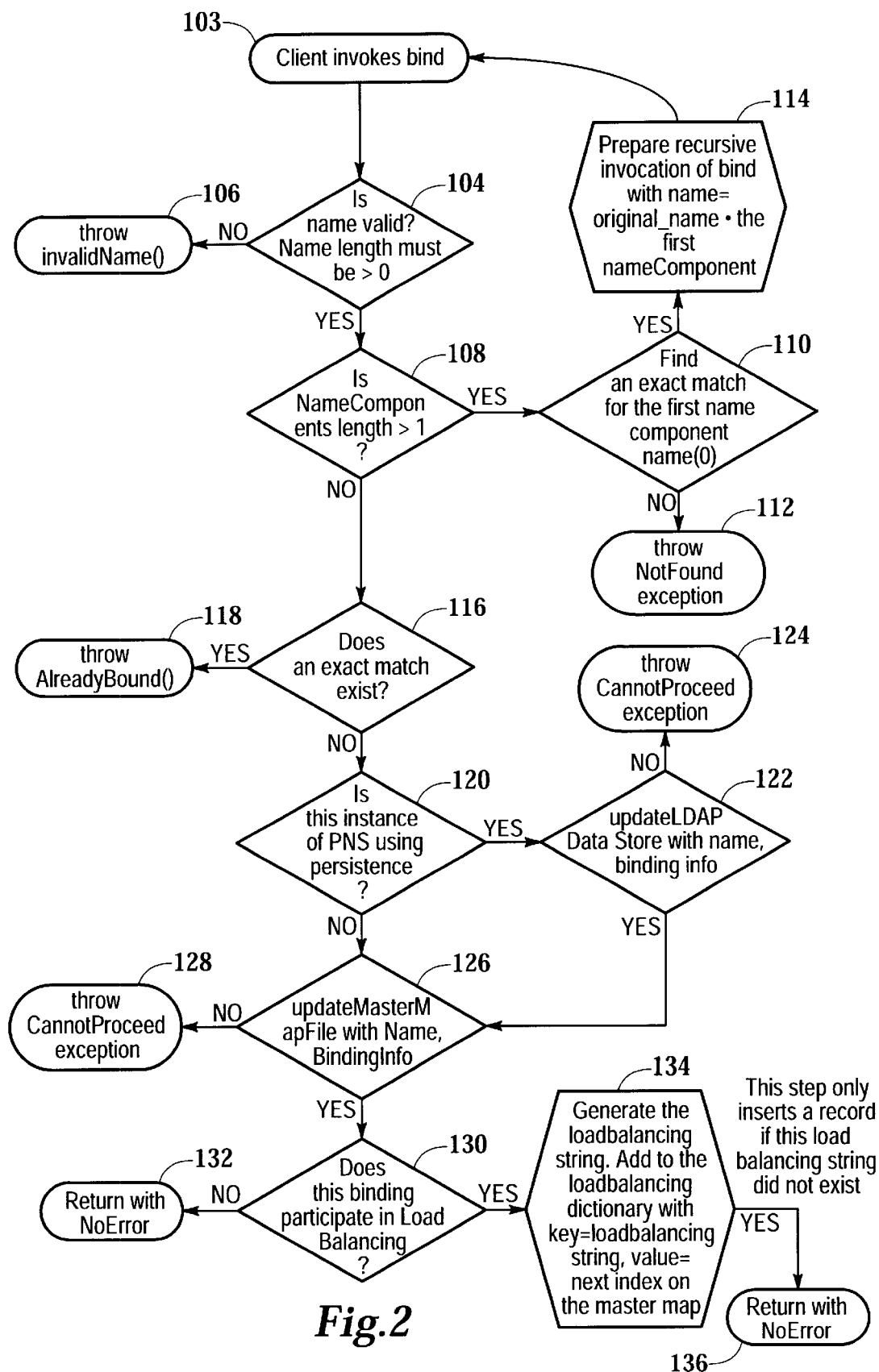
FIG. 2 is a process flow diagram which illustrates the steps associated with performing a bind operation in accordance with an embodiment of the present invention.

A bind operation, as will be described in more detail with respect to FIG. 2, is arranged to bind, or otherwise associate, a name with an object. A rebind operation, which is similar to a bind operation, is arranged to reassociate a name with an object. One difference between a bind operation and a rebind operation is that when a bind operation is called on a name which is already bound, an exception will occur.

A resolve operation, which will be described below with respect to FIG. 3, may be used to look up an association between a name in a name service and an object. In other words, the resolve operation may be used to look up a name and, hence, it's associated object. An unbind operation is used to delete or remove a name from a name service. When a list operation is called, the list operation provides a list of names associated with a name service. A context operation (such as new_context or bind_context), as will be appreciated by those skilled in the art, may be used to create a data structure, e.g., a table, associated with a name service. Finally, a destroy operation is arranged to destroy a particular naming context object that contains no entries in the look-up table.

When an object is to be bound to a name, the name and the object, or an object reference, may be passed into a bind operation as arguments. By way of example, a bind operation that is arranged to bind name "abc" (which could also be referred to as "/a/b/c" or [a, b, c]) to an object "obj" may have the following form:

bind (abc, obj)

In order to bind name "abc" to object "obj", name "abc" is generally first resolved, or looked up. As will be appreciated by those skilled in the art, a bind operation may also be used to bind an object to many other names, such as "def".

Name "abc" has multiple, e.g., three, components. As such, to facilitate the binding of name "abc" to object "obj", components "a" and "b" of name "abc" are resolved, and component "c" of name "abc" is bound to object "obj". As such, bind(abc, obj) may essentially be expressed as resolve (ab).bind(c, obj). In other words, the first N−1 components of a name may be resolved, and the operation to bind an object to the last component, i.e., component N, of the name may be performed on the result of the resolve operation performed on the first N−1 components of the name. The application of the bind operation, called with the last component of a name, to the result of the resolve operation is generally considered to be a "recursion rule."

FIG. 2 is a process flow diagram which illustrates the steps associated with performing a bind operation in accordance with an embodiment of the present invention. Performing a bind operation as detailed in FIG. 2 begins at step 102 where the client application invokes a bind and the data store interface receives the name and the object reference to be bound.

The process flow then moves to step 104 where it is determined whether the name is a valid name. In the preferred version of this aspect, a name is valid if the number of name components is greater than 0 and if for each name component, the length of the id string is greater than 0. If the name determined to not be valid, then the process flow moves to step 106, where an invalid name exception is thrown to the client.

Alternatively, if the determination in step 104 is that the name is valid, then process flow moves to step 108 where it is determined whether the name is equal to the first level, i.e., has only a first level or has only one component. If it is determined that the name has more than one component, then process flow moves to step 110. If the name is equal to the first or lowest level, then process flow moves to step 116.

If the name has more than one component, in step 110 the process resolves for an exact match for the highest level name component. If no match is found then the process flow moves to step 112 and a not found exception is thrown.

If an exact match is found for the highest level component in step 110, then the process prepares a recursive invocation of the bind with name=original name minus the highest level name component (the first name component). This recursive invocation returns the process flow to step 102 with the name supplied and received in step 102 having one less component than on its last trip through the loop. This loop continues until step 108 determines that the name is equal to the first level (has only one component).

After the name has been reduced to the first level, the process flow moves to step 116 where a look up operation is called to see if there is an exact match of the remaining component. If an exact match is found, this indicates that the name is already bound. If the determination is that the name is already bound, then the process flow moves to step 118 and an exception is thrown to the client in step 118 to indicate that the name is already bound, and the process of performing a bind operation is terminated.

If the determination in step 116 is that the name is not present, then the process flow moves to step 120 where the process checks to see if a persistent data store is in use, or it is only running in transient mode. While the preferred embodiment described here incorporates a check for the use of an LDAP compliant directory service, the presence or absence of persistence does not affect the advantages provided by this embodiment of the process. If it is determined that persistence is being used, the process flow moves to step 122 where the LDAP data store is updated with name and binding information. If the updating process fails, then the process flow moves to step 124 where a cannot proceed exception is thrown to the client. If the updating of the persistent data store is successful, then the process flow moves to step 126, which is the same step the process moves to from step 120 if persistence is not being used. Note that in the described, preferred embodiment, the persistent data store is updated prior to the transient data store in active memory. One of skill in the art will recognize, that the transient data store could be updated prior to the persistent store without substantially compromising the advantages provided by the invention.

Once the process has moved either through step 120 or step 122, then process flow moves to step 126 where the transient data store (the Master Map File in this embodiment) is updated with the name and binding information (the object, or object reference) that were passed from the client. If this update fails, then the process flow moves to step 128 where a cannot proceed exception is thrown to the client. If the update is successful, then the process flow moves to step 130.

In step 130, the process flow determines whether the binding participates in load balancing. Preferably this is accomplished by checking to see if the load balancing character is present in the name component. If it is determined that the new binding does not participate in load balancing, then the process moves to step 132, where the bind operation returns to the client with no error.

If it is determined that the new binding does participate in load balancing, then the process flow moves to step 134. In step 134, a load balancing string is generated, where, in the preferred embodiment, the load balancing string is the load balancing identifier of the name component (the portion of the name component prior to the load balancing character). While not the preferred method, one of skill in the art will recognize that the load balancing string (and the load balancing identifier) could take other forms, for example that portion of the name after the load balancing character. Once the load balancing string is generated the load balancing dictionary (also referred to as the load balancing index or the load balancing map) is updated to reflect the load balancing identifier which is identified with the longer, full name identifier on the Master Map File. If the particular load balancing identifier existed previously, then a new record will not need to be inserted in the load balancing index, but the record in the load balancing index for the load balancing identifier will be updated to also recognize the new, full name identifier on the Master Map File which is participating in load balancing using that load balancing identifier.

The process flow then completes by moving to step 136 where the bind operation is returned to the client with no error.

As will be appreciated by those skilled in the art, in addition to binding a name to an object, a bind operation may be arranged to store the name and the object reference associated with the object into a database or any suitable storage mechanism. By way of example, the bind operation may include standard methods which are used to write a name and an object reference to a non-volatile memory such as a disk. In the described embodiment, the bind operation is associated with a data store interface. After the bind operation is called, the name is bound to the object, and the process of binding a name to an object is completed.

In addition to performing a bind operation, as mentioned above, name service implementations also include a variety of other operations. The operations include a resolve operation, an unbind operation, and a destroy operation. Typically, many of the general steps associated with each operation are substantially the same. By way of example, the several general steps associated with performing a resolve operation are approximately the same as those associated with an unbind operation. That is, steps associated with looking up a name (in order to either resolve the name or to unbind the name) may be substantially the same. However, specific steps associated with the performance of the resolve operation itself may be different from the specific steps associated with the performance of an unbind operation.

Figure 3:
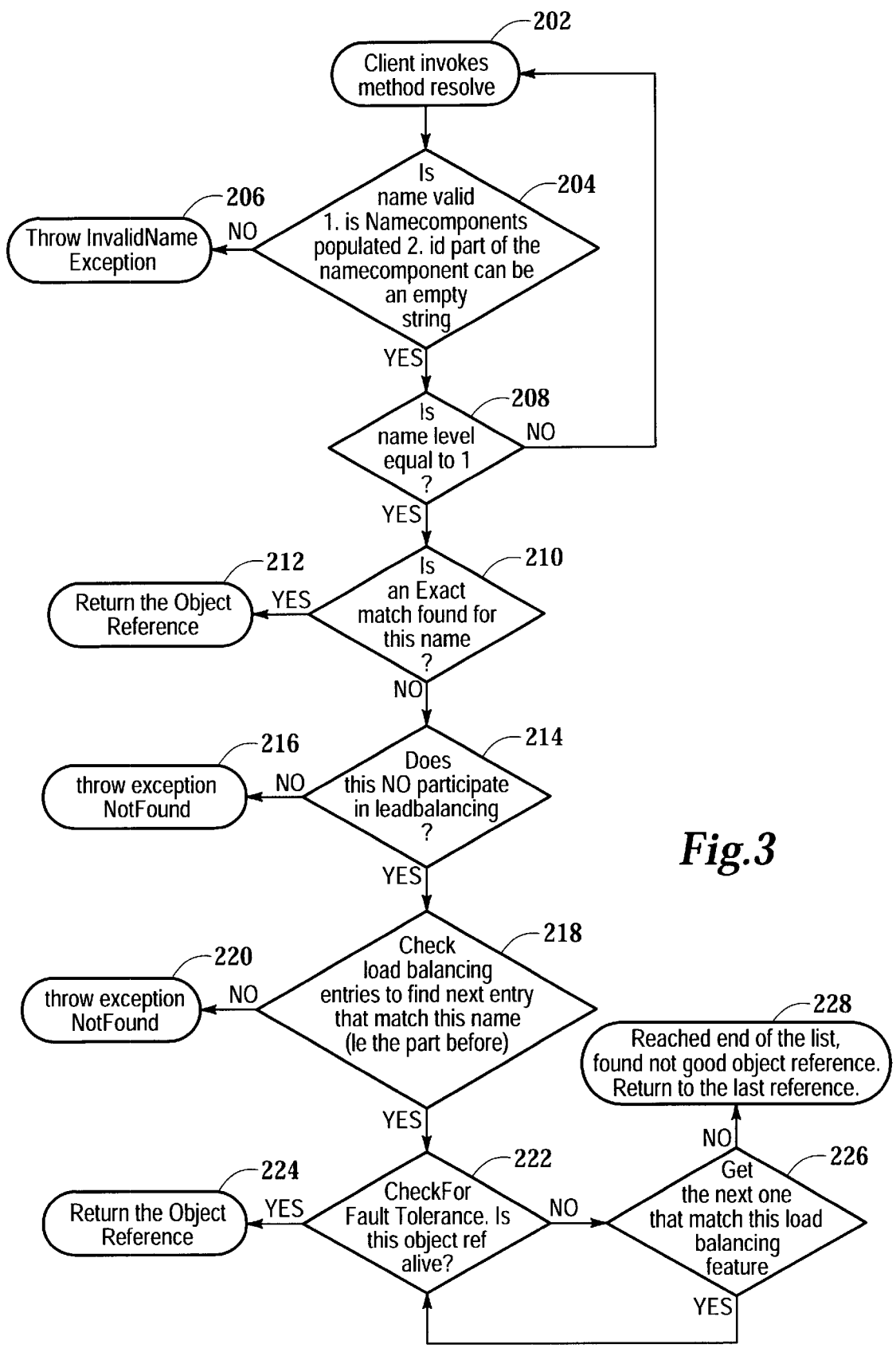
FIG. 3 is a process flow diagram which illustrates the steps associated with performing a resolve method in accordance with an embodiment of the present invention.

FIG. 3 is a process flow diagram which illustrates the steps associated with performing a resolve operation in accordance with an embodiment of the present invention. In one embodiment, a client may provide a server object with a name, and request that the server object invoke a resolve operation to resolve the name using a name service in a system which supports both a transient name service and a persistent name service. The process of performing a resolve operation begins at step 202 where the client invokes a resolve and the resolve operation receives the name to be resolved from the client.

The process, flow then moves to step 204 where it is determined whether the name is a valid name. In the preferred version of this aspect, a name is valid if the number of name components is greater than 0 and if for each name component, the length of the id string is greater than 0. If the name determined to not be valid, then the process flow moves to step 206, where an invalid name exception is thrown to the client.

If the name is determined to be valid then the process flow moves to step 208. In step 208, the process checks whether the name is equal to the first level (has only one component). If the name is not equal to the first level, then the process recursively returns to step 202. Although not illustrated in this figure, typically the process will prepare a recursive invocation of the resolve with name=original name minus the highest level name component (the first name component). Additional steps may occur in this recursive process, such as error checking or validity checking, as will be recognizable to one of skill in the art.

If the name is equal to the first level, then the process flow moves to step 210 where the process checks for an exact match for the name. If an exact match is found, then the process moves to step 212 where an object reference is returned to the client and the process is ended. In this manner, if the client invokes a name which either does not participate in load balancing or the client invokes the full name component of a name which does participate in load balancing (rather than merely invoking the load balancing identifier), an object reference is returned before the resolve operation takes any steps involved with the load balancing feature. Although it is not necessary that the check for an exact match occur first, by executing the check for an exact match before entering the steps related to load balancing no additional time is wasted compared to a standard resolve operation without load balancing. To this point, steps 202 through 212 represent a standard resolve operation and could be modified to use other alternative standard resolve operations as would be understood by one of skill in the art.

If, on the other hand, an exact match is not found in step 210, then the process flow moves to step 214. In step 214, the process checks to see if the name invoked by the client participates in load balancing. In the described embodiment, this is done by checking to see if the name is listed in the load balancing index. If the name is not listed in the load balancing index and therefore is not participating in load balancing, and from step 210 it is known that no exact match has been found, then the process moves to step 216 where a not found exception is thrown to the client.

If the name is found to participate in load balancing, then the process moves to step 218. In step 218, the load balancing entries in the load balancing index are checked to determine which entry to return to the client. Preferably the determination of which load balancing entry to return is accomplished by a round robin method, but it could be accomplished by other means understood to those of skill in the art, such as a least loaded method. Those other alternative means of determination would take additional steps not described in this preferred embodiment which would be known to those of skill in the art.

In the preferred embodiment, a round robin method is used to determine which load balancing entry to return. The round robin method works by setting a flag noting which of the entries in the load balancing index responsive to the load balancing identifier (the name invoked by the client) was last returned. This flag may be stored s a part of the load balancing index (preferred), in the master map, or in a separate file as desired by the programmer. The process will note which entry was last returned and will return the next entry in the load balancing index which is responsive to the load balancing identifier. If the process fails and is not able to return a responsive entry, then the process will move to step 220 and throw a not found exception to the client.

Load Balancing with Rudimentary Fault Tolerance

In one embodiment, the resolve process could return a determined entry at this point to the client. In the preferred embodiment, rudimentary fault tolerance is added by the addition of an additional sequence of steps. Although the use of rudimentary fault tolerance is preferred, it is not necessary to gain the advantages of the load balancing feature. If rudimentary fault tolerance is being employed, then step 218 is considered to have preliminarily identified an entry. The preliminarily identified entry is passed to step 222.

In step 222, the object reference associated with the preliminarily identified entry is checked to see if it is existent. The check for existence is preferably a "non-existent" call, but alternatively could use an "is_a" method or both depending on the circumstances. If the object reference is existent, then the preliminarily identified entry is determined as the entry to be returned to the client through step 224. If the preliminarily identified entry is not existent, then the process moves to step 226 (which alternatively may be recognized as a return to step 218) where the next load balancing entry from the load balancing index is identified as the preliminarily identified entry. This new preliminarily identified entry is then passed back to step 222 for checking. So long as additional entries responsive to the load balancing identifier invoked by the client remain unchecked, the steps of checking 222, determining (if existent) (step 222 leading to step 224), and preliminarily identifying 218 or 226 are repeated. Once any preliminarily identified entry checks as existent then that entry will be determined as the entry to return and the process will move to step 224 to return the determined entry to the client.

If the last preliminarily identified entry checked as non-existent and no unchecked responsive entries remain in step 226 then the process flow moves to step 228, where, in the preferred embodiment, the last preliminarily identified entry is determined as the entry to return. Alternative embodiments could use any of several alternative procedures at this point in the process. Step 228 could throw a not found exception. Step 228 could send the process back to step 226 to continue cycling through the entire list of responsive entries a defined number of times until one of the preliminarily identified entries checks as existent or until the number of cycles determined by the programmer runs out. Step 228 could determine randomly an entry to return. Step 228 could return the last entry which successfully returned existent, even if that entry did not return existent during this particular process. Those of skill in the art will recognize that other selection options could exist at this point. Regardless, the proffered alternatives are possible, it is preferred to use the step 228 defined in FIG. 3. The use of this option provides the reason that this process from step 222 through step 228 is referred to as rudimentary fault tolerance. Most of the other options would provide more complete fault tolerance but would come at the expense of additional overhead. Returning an exception is also not as preferred, because events over time may have an object return non-existent at one moment, but by the time the client goes to the object the object may be existent again. Finally, the client probably has its own programming defining what steps it would prefer to take if the object it is seeking is non-existent. These client specific steps are more directly tailored for the client than any process which could be defined on the server level resolve being addressed here. For example, the client might send an activation agent, or the client might have an alternative object in mind to try to resolve. It is considered preferable to perform the rudimentary fault tolerance, but not use additional time and resources on the server side for best overall efficiency. Again, in part based on the idea that the client may more efficiently know what is wants to do in the event the object it is seeking is non-existent, one embodiment of the invention uses load balancing without providing fault tolerance at all. While not the most preferred embodiment, this would still provide the advantages of the load balancing feature.

Computer Systems

Figure 4:
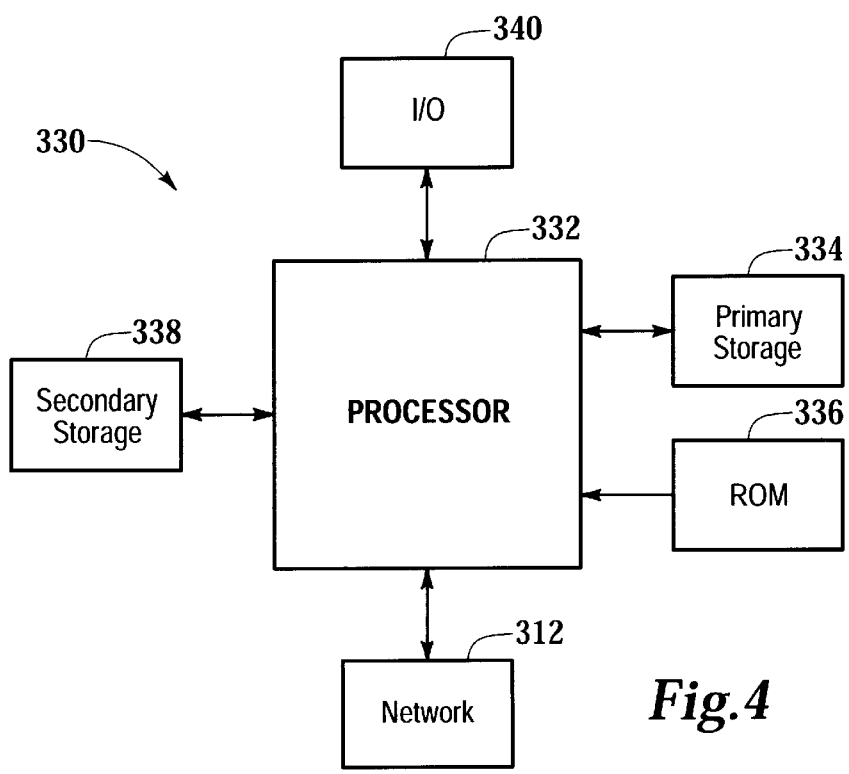
FIG. 4 is a diagrammatic representation of a computer system suitable for implementing the present invention.

A name service as described above may generally be implemented on a variety of different computer systems. FIG. 4 illustrates a typical, general-purpose computer system suitable for implementing the present invention. The computer system 330 includes a processor 332 (also referred to as a central processing units, or CPU) that is coupled to memory devices including primary storage devices 336 (typically a read only memory, or ROM) and primary storage devices 334 (typically a random access memory, or RAM).

As is well known in the art, ROM acts to transfer data and instructions uni-directionally to CPU 332, while RAM is used typically to transfer data and instructions in a bi-directional manner. Both storage devices 334, 336 may include any suitable computer-readable media. A secondary storage medium 338, which is typically a mass memory device, is also coupled bi-directionally to CPU 332 and provides additional data storage capacity. The mass memory device 338 is a computer-readable medium that may be used to store programs including computer code, data, and the like. Typically, mass memory device 338 is a storage medium such as a non-volatile memory such as a hard disk or a tape which generally slower than primary storage devices 334, 336. Mass memory storage device 338 may take the form of a magnetic or paper tape reader or some other well-known device. It will be appreciated that the information retained within the mass memory device 338, may, in appropriate cases, be incorporated in standard fashion as part of RAM 336 as virtual memory. A specific primary storage device 334 such as a CD-ROM may also pass data uni-directionally to the CPU 332.

CPU 332 are also coupled to one or more input/output devices 340 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 332 optionally may be coupled to a computer or telecommunications network, e.g., an internet network, or an intranet network, using a network connection as shown generally at 312.

With such a network connection, it is contemplated that CPU 332 might receive information from the network, or might output information to the network in the course of performing the above-described method steps. Such information, which is often represented as a sequence of instructions to be executed using CPU 332, may be received from and outputted to the network, for example, in the form of a computer data signal embodied in a carrier wave. The above-described devices and materials will be familiar to those of skill in the computer hardware and software arts.

In one embodiment, sequences of instructions may be executed substantially simultaneously on multiple CPUs, as for example a CPU in communication across network connections. Specifically, the above-described method steps may be performed across a computer network.

Although only a few embodiments of the present invention have been described, it should be understood that the present invention may be embodied in many other specific forms without departing from the spirit or the scope of the present invention. By way of example, the steps associated with performing bind operations and resolve operations may generally be reordered, added, and removed. Similarly, some or all of the arguments used in the performance of a bind operation, e.g., arguments passed into a call to a dobind method, may also be checked for validity without departing from the spirit or the scope of the present invention.

Additionally, it should be appreciated that the data storage mechanisms, or data stores, used to store bindings may also be widely varied. Data storage mechanisms may generally include computer hard drives and tape drives. Further, data storage mechanisms may be located anywhere within a computer network.

Further, although a name service has been described in terms of including the ability to store properties, it should be appreciated that in one embodiment, a name service may include only the ability to store bindings between names and objects. Therefore, the present examples are to be considered as illustrative and not restrictive, and the invention is not to be limited to the details given herein, but may be modified within the scope of the appended claims along with their full scope of equivalents.

What is claimed is:

1. A computer-implemented method for implementing a name service, the method comprising:
    (a) creating a name service, the name service being arranged to store persistent information; and
    (b) creating at least one storage mechanism arranged to store the persistent information; wherein the at least one storage mechanism comprises a directory service;
    (c) creating a data store interface within the name service to interact with the data store to store and retrieve the stored information;
    (d) creating a load balancing index within the data store interface;
    (e) using name overloading to create names containing a load balancing name identifier in the name component of the names which may be used for referencing in the load balancing index where the load balancing identifier is a subset of the name component of the names;
    (f) storing names containing a load balancing identifier in the load balancing index in a form which may be referenced by the load balancing identifiers of the respective names.

2. A computer-implemented method as recited in claim 1 wherein the directory service is compliant with LDAP version 2.

3. A computer-implemented method as recited in claim 2 wherein the interaction between the data store interface and the persistent data store comprises the use of protocol compliant with LDAP version 2.

4. A computer-implemented method as recited in claim 3 wherein the name service is compliant with CORBA Cos-Naming Specification.

5. A name service within a computer system, the name service being arranged to store persistent information, the name service comprising:
    (a) at least one storage mechanism arranged to store the persistent information, wherein the at least one storage mechanism comprises a directory service;
    (b) a data store interface for interacting with the directory service, wherein such interaction comprises the use of protocol compliant with LDAP version 2;
    (c) a load balancing index within the data store interface;
    (d) name-overloaded names which contain load balancing identifiers within the name components of the names which may be used for referencing in the load balancing index, wherein the name-overloaded names containing load balancing identifiers are stored in the load balancing index in a form which may be referenced by the load balancing identifiers of the respective names.

6. A computer system arranged to implement a name service, the name service being arranged to store persistent information, the computer system comprising:
    (a) a processor;
    (b) a data store interface for interacting with the at least one storage mechanism;

(c) at least one storage mechanism arranged to store the persistent information, wherein the at least one storage mechanism is in the form of a directory service encapsulated in the data store interface;

(d) a load balancing index within the data store interface;

(e) name-overloaded names which contain load balancing identifiers which may be used for referencing in the load balancing index, wherein the name-overloaded names containing load balancing identifiers are stored in the load balancing index in a form which may be referenced by the load balancing identifiers of the respective names.

7. A computer system as recited in claim 6 wherein, the interaction between the data store interface and the at least one storage mechanism comprises the use of protocol compliant with LDAP version 2.

8. A computer program product for implementing a name service, the computer program product comprising:

(a) computer code that creates a name service, the name service being arranged to store persistent information, wherein the at least one storage mechanism is arranged to store the persistent information;

(b) computer code that creates a data store interface for interacting with the at least one storage mechanism;

(c) computer code that creates the at least one storage mechanism arranged to store the persistent information, wherein the at least one storage mechanism is encapsulated in the data store interface, and wherein the at least one storage mechanism comprises a directory service;

(d) computer code that creates a load balancing index within the data store interface;

(e) computer code that recognizes name-overloaded names which contain load balancing identifiers in the name components of the names;

(f) computer code that stores names containing a load balancing identifier in the load balancing index in a form which may be referenced by the load balancing identifiers of the respective names; and (g) a computer readable medium that stores the computer codes.

9. A computer program product as recited in claim 8 wherein:

the interaction between the data store interface and the at least one storage mechanism comprises the use of protocol compliant with LDAP version 2; and wherein the directory service is compliant with LDAP version 2.

10. A computer program product as recited in claim 9 wherein the computer readable medium is a code representation embodied in a carrier wave.

11. A computer-implemented method as recited in claim 1 wherein the data store interface further comprises a bind operation, the method of the bind operation comprising:

(a) receiving the name and object reference;

(b) binding the name with the object reference;

(c) determining whether the name participates in load balancing;

(d) adding the name to a load balancing index if it is determined that the name participates in load balancing.

12. A computer-implemented method as recited in claim 1 wherein the data store interface further comprises a resolve operation, the method of the resolve operation comprising:

(a) receiving a name;

(b) determining whether the name participates in load balancing;

(c) determining the entry in the load balancing index to return;

(d) returning the object reference associated with the determined entry from the load balancing index.

13. The computer-implemented method of claim 12 wherein said step of determining the entry in the load balancing index to return comprises:

(c1) preliminarily identifying a responsive entry in the load balancing index;

(c2) checking to see if the object reference associated with the preliminarily identified entry is existent;

(c3) determining the preliminarily identified entry as the determined entry if the object reference associated with the entry is existent;

(c4) preliminarily identifying the next responsive entry in the load balancing index if the previous preliminarily identified entry is not existent;

(c5) repeating (c2), (c3), and (c4) so long as unchecked responsive entries remain in the load balancing index and an existent entry has not been determined;

(c6) determining a responsive entry as the determined entry if no unchecked responsive entries remain in the load balancing index.

14. The computer-implemented method of claim 13 wherein said step of determining a responsive entry as the determined entry if no unchecked responsive entries remain in the load balancing index comprises determining the last preliminarily identified entry as the determined entry if no unchecked responsive entries remain in the load balancing index.

\* \* \* \* \*